United States Patent [19]

Chen

[11] Patent Number: 4,464,753

[45] Date of Patent: Aug. 7, 1984

[54] TWO BIT SYMBOL SEC/DED CODE

[75] Inventor: Chin L. Chen, Wappingers Falls, N.Y.

[73] Assignee: International Business Machines Corporation, Armonk, N.Y.

[21] Appl. No.: 349,482

[22] PCT Filed: Dec. 30, 1981

[86] PCT No.: PCT/US81/01767

§ 371 Date: Dec. 30, 1981

§ 102(e) Date: Dec. 30, 1981

[87] PCT Pub. No.: WO83/02345

PCT Pub. Date: Jul. 7, 1983

[51] Int. Cl.³ ............................................. G06F 11/10
[52] U.S. Cl. ...................................................... 371/38
[58] Field of Search ........................................ 371/37, 38

[56] References Cited

U.S. PATENT DOCUMENTS

| | | | |
|---|---|---|---|
| 3,634,821 | 1/1972 | Bossen et al. | 371/37 |
| 4,077,028 | 2/1978 | Lui et al. | 371/38 |
| 4,319,357 | 3/1982 | Bossen | 371/38 |
| 4,358,848 | 11/1982 | Patel | 371/38 X |

OTHER PUBLICATIONS

Bossen et al., *Measurement and Generation of Error Correcting Codes for Package Failures*, IEEE Transactions on Computers, vol. C-27, No. 3, Mar. 1978, 201-204.

W. H. Cochran and W. A. Lopour, IBM Technical Disclosure Bulletin, *Optimized Error Correction/Detection for Chips Organized Other Than By-1*, vol. 24, No. 10, Mar. 1982, 5275-6.

*Primary Examiner*—Charles E. Atkinson
*Assistant Examiner*—Clark A. Jablon
*Attorney, Agent, or Firm*—James E. Murray

[57] ABSTRACT

A modularized error correction apparatus for correcting package errors is provided by expanding an N bit single error correction, double error detection code to cover N packages of M bits each, so that the Exclusive-OR of all M bit single bit error syndromes in any given package results in a composite syndrome which is unique for each package. See FIG. 2 for the parity matrix H and the matching matrix M for the error correction code.

4 Claims, 4 Drawing Figures

FIG. 2 (24,16) CODE

TWO BIT SYMBOL SEC/DED CODE

BACKGROUND OF THE INVENTION

The present invention relates to error correcting codes (ECC's) for the correction of packaging errors in memory arrays. More particularly, the present invention relates to ECCs for the correction of all failures of a single monolithic memory chip and the detection of all failures of two such chips in a memory where each of the monolithic chips contains 2 bits from a single word.

From an error correction standpoint, it is highly desirable that semiconductor memory systems be organized on a bit per chip basis. In a memory with this type of organization 72 chips would be required to store a 72 bit codeword with each bit of the word on a different chip. The advantage of using one bit per chip memory organization is that a single error correction/double error detection (SEC/DED) error correcting code (ECC) can be used to correct errors when there is a total failure of a chip.

A disadvantage of the one bit per chip organization is that it consumes more electrical power than a multibit per chip organization since there are more chips needed to form an ECC codeword and each of the chips must be powered up when the memory is assessed. Therefore, ECC codes that correct single errors and detect double errors caused by both bit and package failures in a memory organized on a multibit per chip basis are highly desirable.

Single error correction/double error detection (SEC/DED) codes for detecting package errors are shown in U.S. Pat. No. 4,077,028. The problem with these codes is that they do not correct for package errors.

A b-adjacent code of the type described in Bossen U.S. Pat. No. 3,634,821 assigned to the assignee of the present invention can be adapted to correct the failure of a single multibit package and detect failure of two multibit packages by the addition of an additional check symbol. The problem with using a b-adjacent code is the large number of check bits required to do the detecting and correcting. Three ECC check bit bytes are necessary in order to correct a one byte error and detect a two byte error using such a b-adjacent code. The number of bytes n correctable by the code is equal to $n=2^b+2$. Thus, for a two bit byte $n=6$. Since three of the six bytes are ECC check bit bytes only three of the bytes would be data bit bytes.

Another way to correct all single package errors and detect all double package errors, would be to adopt Reed-Solomon codes. Such a technique is described in an article by Kaneda and Fujiwara entitled "Single Byte Error Correcting—Double Byte Error Detecting Codes for Memory Systems" on pages 41 to 46 of the Proceedings of the 10th Fault Tolerant Computing Symposium held on Oct. 1-3, 1980. In the article, an existing Reed-Solomon packaged error correcting code is expanded to generate a longer code length package error correcting code which makes efficient use of check bits. While the general catagory of this generalized code makes of efficient use of check bits, those described as being modularized are no so efficient.

Therefore, it would be desirable to provide a new modularized code that makes efficient use of the number of correction bits needed to correct single package errors and detect double package errors where the package errors can be one or more bits in error.

THE INVENTION

In accordance with the present invention, encoding means is provided for encoding data words into code words in which the exclusive OR of all single bit error syndromes in any convenient package results in a composite syndrome which is unique in each package. This code is a single error detection double error correction code which has been expanded to cover m bits where m is equal to the number of bits in the package.

Therefore, it is an object of the present invention to provide a new code to correct single and double bit errors and at the same time correct single package errors and detect double package errors.

It is another object of the present invention to correct single package errors and detect double package errors with less check bits than required previously.

It is a further object of the invention to provide a modularized code to correct all single and detect all double package errors.

THE DRAWINGS

These and other objects of the invention can best be understood by reference to the embodiment of the invention illustrated in the accompanying drawings of which:

FIG. 2 are tables showing the parity matrix H and the matching matrix M of an ECC for the memory shown in FIG. 1;

THE PREFERRED EMBODIMENT

Figure 1:
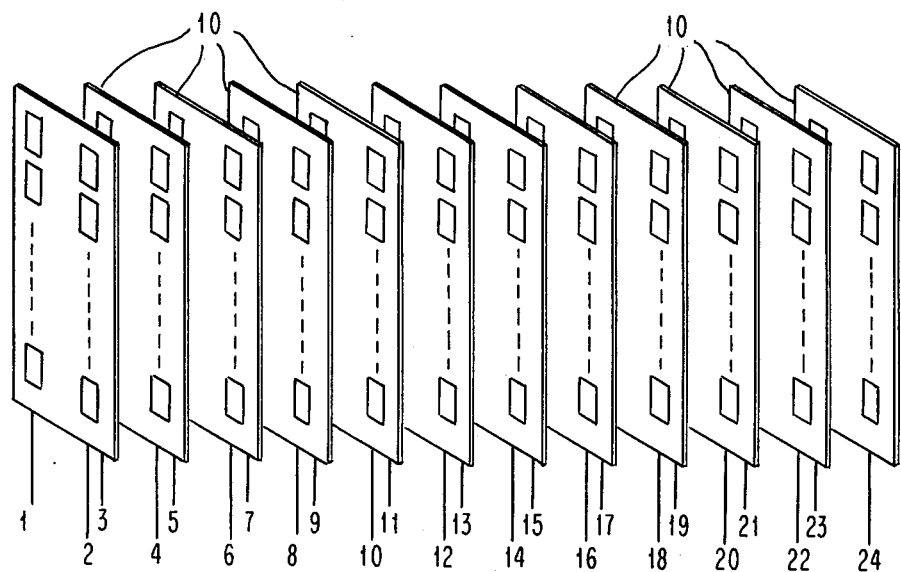
FIG. 1 is a schematic representation of a memory employing the present invention.

In FIG. 1, a 24-bit codeword is stored in a memory on twelve monolithic chips 10 with two bits on each chip. For reasons that will be apparent hereafter, eight are check bits and sixteen are data bits. If the data bits on each chip 10 are considered to be a single symbol the codeword is made up of 12 symbols. In accordance with the present invention each symbol as assumed to be a single bit and a SEC/DED error correcting code is generated based on that assumption.

Consider the arrangement of putting three identical objects into R pockets. There are K/2 possible arrangements where $K=R\cdot(R-1)\cdot(R-2)/3$ data symbols. For each of such arrangement, we form an R-component column vector V according to the following rules: V contains A's at positions corresponding to empty pockets and V contains B's at positions corresponding to pockets that contain the objects. For example, R=4, K=8, we have the following four column vectors:

$$ABBB$$
$$BABB$$
$$BBAB$$
$$BBBA$$

Thus, we can form K/2 R-component vectors that contain A's and B's. Some of the vectors are cyclic shifts of other vectors. We can group these vectors into equivalent classes so that vectors in each class are cyclic shifts of a class representative. Let V1 be a representative of an equivalent class. We form a vector V2 by substituting the three B's of V1 in sequential order by B, C and D. Now we generate a set of vectors by cyclic shifting V2 as many times as the number of vectors in the equivalent class that contains V1. There are K/2 vectors that can be generated from this procedure. Combining the set of vectors with A and B components only and the derived set of vectors with A, B, C and D components, we have K column vectors. Let us call the matrix formed P. For R=4 we have $$P = \begin{vmatrix} A A B D B C B B \\ B B A A B D B C \\ B C B B A A B D \\ B D B C B B A A \end{vmatrix}$$

We now substitute the letters A, B, C and D in P with the following matrices:

$$A = \begin{vmatrix} 0 & 0 \\ 0 & 0 \end{vmatrix} \quad C = \begin{vmatrix} 0 & 1 \\ 1 & 1 \end{vmatrix}$$

$$B = \begin{vmatrix} 1 & 0 \\ 0 & 1 \end{vmatrix} \quad D = \begin{vmatrix} 1 & 1 \\ 1 & 0 \end{vmatrix}$$

The matrix P becomes 8 × 16 binary matrix. Concatenating the binary matrix P with an identity matrix of order 2R, we have the parity check matrix H of FIG. 2. It can be proved that the code constructed has a minimum distance of 4 over GF(4), and thus it can correct single symbol errors and detect double symbol errors, where a symbol consists of 2 bits.

Figure 2:
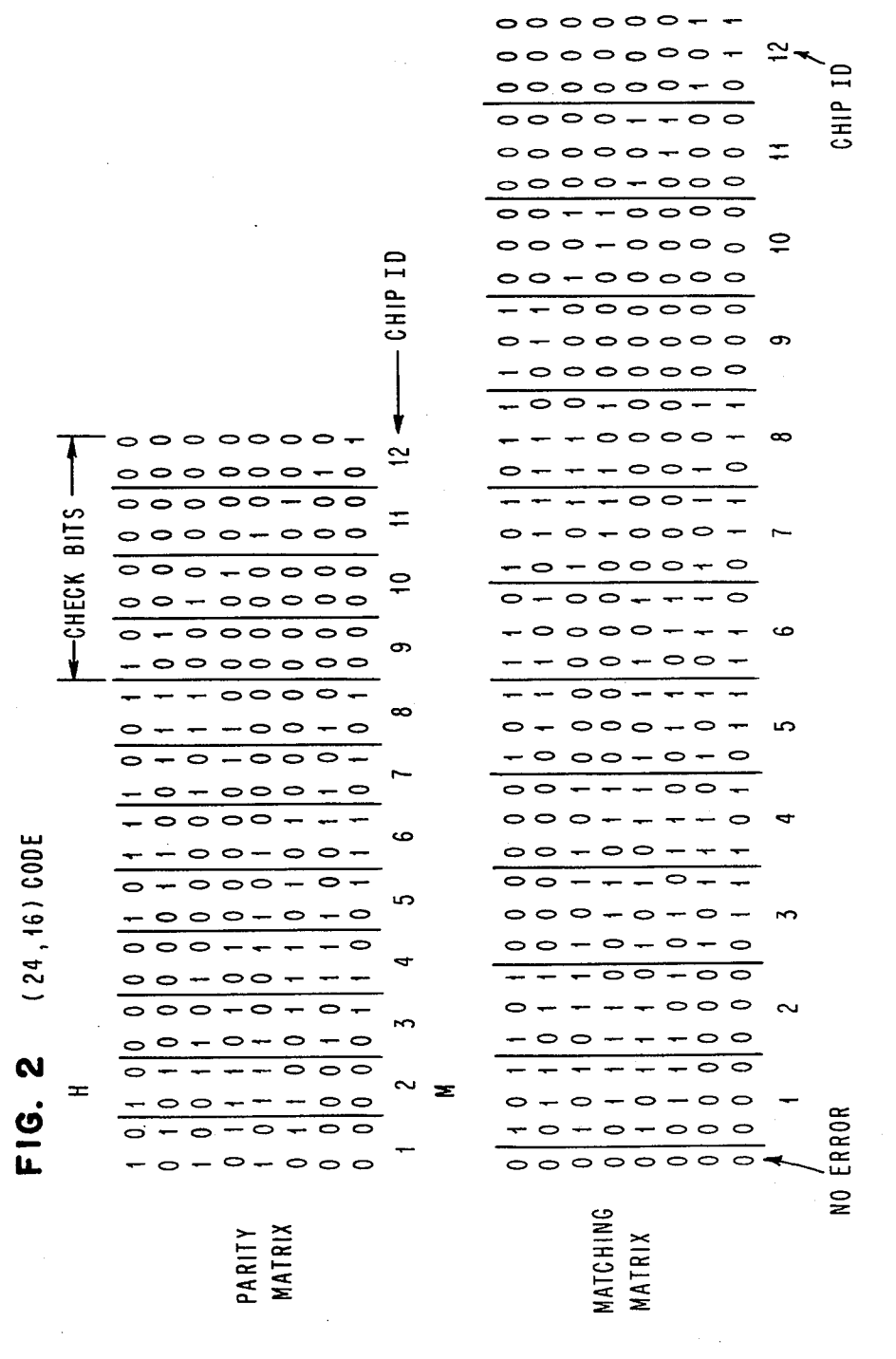

In the parity matrix H of FIG. 2, each column represents one bit of the code word. The vertical lines between each two columns represent a package or chip boundary. That is, each two bits in the 24 bit code word are on a different chip as shown in FIG. 1. The binary ones in each of the eight rows in the matrix M show which bits are exclusive ORed together by an encoder to generate one of the eight check bits stored with the 16 data bits. For instance, it can be seen from the top row of the matrix that data bits 1, 3, 9, 11, 12, 13 and 16 in the word are exclusive ORed together to generate the first check bit.

The matching matrix M in FIG. 2 shows the syndromes generated during decoding. If there is no error the syndrome will be a string of eight 0's shown in the first column of the matrix. If there are correctable or uncorrectable errors one or more of the syndromes will be one. Each column containing 1's in the matching matrix M is a syndrome pattern for a single error in one of the bit positions or is a syndrome pattern for a single package failure. For instance, the first of the three columns between the first two vertical lines of the matching matrix M shows the syndromes when a single error has occurred in the first bit of the word, the second column is the syndrome for a single error located in the second bit of the word and the third column which is the exclusive OR of the syndromes of the first two columns is the syndrome pattern for the failure of the package containing the first two bits in the word.

Figure 3:
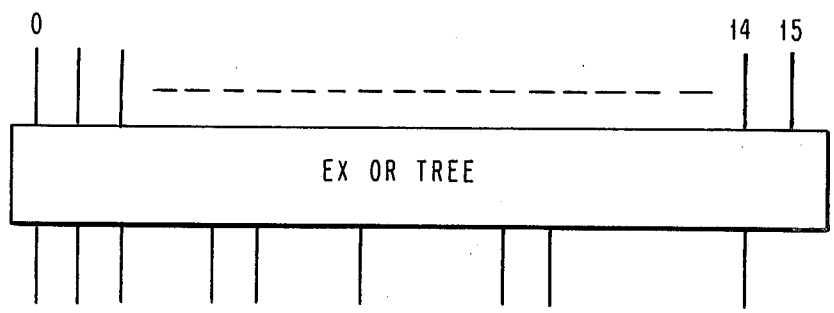
FIG. 3 is a schematic representation of an ECC encoder for the memory shown in FIG. 1.

As shown in FIG. 3 a correctional exclusive OR encoding tree 12 is used to generate the parity bits stored in the memory of FIG. 1. The encoding tree is configured in accordance with the parity matrix H of FIG. 2. For instance, the data in the first bit of chip 9 is the exclusive-OR of the data in the first bits of chips 1, 2, 5, 6, 7 and the second bit of chips 6 and 8. If 2-way exclusive-OR gates are used, each check bit is generated using 6 exclusive-OR gates and 3 levels of logic delay.

Figure 4:
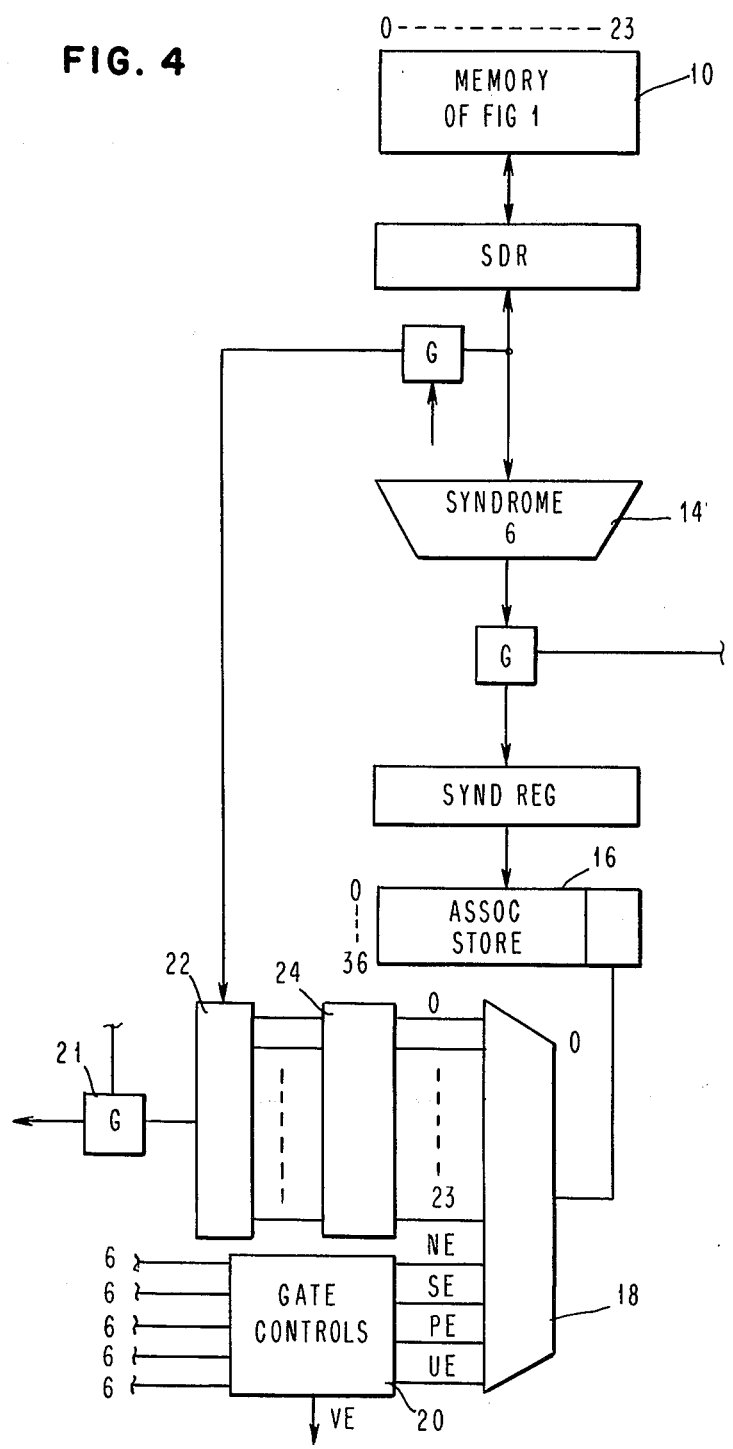
FIG. 4 is a schematic for an ECC decoder for the memory shown in FIG. 1.

In FIG. 4, the eight bit output of the syndrome generator 14 is logically the exclusive-OR of the 24 data and check bits read out of the memory 10 shown in FIG. 1. The syndrome decoder 16 is similar to the one shown in Bossen U.S. Pat. No. 4,319,357 entitled "Double Error Correction Using a Single Error Correcting Code." The decoder 16 is a 37 word associative storage with each of the syndrome bit patterns for a single bit or package error plus the syndrome bit pattern of an errorless word stored at a different word location.

Stored along with each syndrome is a bit number identifying the position of the bit or bits in error in binary sequence. When an interrogation of the table 16 results in a match condition the stored syndrome and the 6 bit binary number identifying the bit position or bit positions in error is read from the associative store.

Assume that the syndrome generator 14, produces a syndrome of all zeros, or in other words, a syndrome which indicates no bits in the accessed word are in error. Stored along with the syndrome in the associative store with the all zero syndrome would be a string of 6 additional zeros indicating that there is no error. This string of 6 zeros is fed to decoder 18 which then sends a no error signal (NE) to the gate control circuitry 20. This control circuitry 20 generates a gate signal for gate 21 allowing the error free data word stored in register 22 to be transmitted. Again, assume that the syndrome generator generates a syndrome $S_i$ that would indicate that a single bit error has occurred at bit location i. Since all the syndromes identifying single bit errors are stored in the table 16, interrogating with the syndrome $S_i$ results in the location of the bit i in 6 bit binary notation being read out of the associative store 16. The 6 bit binary location of the bit in error is fed to the decoder 18 which decodes it into the one of the 24 locations of the bit inverter 24 for inverting bit i in the word stored in the output register 22. After bit i has been inverted, the controller generates the signal for gate 21 to transmit the corrected word to the processor. If the syndrome generator 14 generates a package error syndrome Spi, interrogating the associative store results in the location of the package pi in 6 bit binary notation being read out of the associative store 16. The six bit binary location of the bit in error is fed to decoder 18 which decodes into the two of the 24 locations of the bit inverter 24 for inverting bits i and i+1 making up the package in error. The inverter inverts these two bits and the corrected data word is transmitted to the processor.

Finally, assume now that a syndrome generator 18 generates a syndrome $S_u$ that does not match with any of the 36 syndromes stored in the associative store 16. Associative store 16 then transmits a 6 bit no compare signal to decoder 18 which transmits an uncorrectable error signal UE to the gate control circuitry 20. Upon receipt of a no compare signal the gate controls flag the appropriate processor that the UE condition exists.

Described above is one embodiment of my invention.

In this embodiment a code and its construction have been described for the case where M, the number of bits per package, is equal to two. The concepts used in the construction of a code where M=2 can be used in cases where M is greater than two by expansion of the submatrices A, B, C and D of the matrix P. As previously shown, submatrix A is an M×M all zero's matrix; submatrix B is the M×M identity matrix; submatrix C is the companion matrix of a primitive polynomial of degree M (see Error-Correcting Codes by W. W. Peterson and E. J. Weldon, Jr., MIT Press, 1972); and submatrix D is the square of matrix C. for M=3, the primitive polynomial $1+X=X^3$ is used to define C. For M=3, any primitive polynomial of degree M can be used to define C. In general, the parity check matrix has R check symbols and $K=R(R-1)(R-2)/3$ data symbols or M K data bits.

A code constructed by this technique can correct all single package errors and detect all double package errors, where a package error may have any number of erroneous bits from 1 to M. A modified version of the apparatus in FIG. 4 can be used to detect and correct all single bit errors and single package errors for values of M greater than 2. The associative store 16 of the modified version would store all single error syndrome patterns, all possible single package error syndrome patterns plus the all zeros syndrome so that the store 16 would contain $1+N(2^M-1)$ syndrome patterns where $N=R+K$. The number of bits stored in the store 16 along with each syndrome and the equal number of input bits for decoder 14 will vary in accordance with the formula $X=[log_2 N]+M$ where X is the number of such bits. Correction and detection using this modified version is essentially the same as has previously been described for the case where M=2. When an all zeros syndrome is produced by the syndrome generator 14 the match with the all zero syndrome stored in the store 16 causes the error free data word stored in register 22 to be transmitted. A match of a syndrome produced by generator 14 with any of the other syndrome patterns stored in the store 16 results in correction in register 22 of the bit or bits in error in the data word in register 22 as described previously and if the syndrome produced by the generator 14 does not match any of the stored patterns a UE condition is indicated by the decoder 18.

Other codes can be developed using the described techniques with different values of R and K. The following is a table of the parameters of some of the possible codes:

| No. of Data Bits | No. of Check Bits |
| --- | --- |
| 16 | 8 |
| 40 | 10 |
| 80 | 12 |

It can be seen that for 2R check bits, a code in this family can have up to 2K data bits where $K=R(R-1)(R-2)/3$. For applications where the number of data bits is less than 2K, the code can always be shortened. This is done by deleting as many column vectors in P as required to yield the exact number of data bits. For example, to construct a code with 32 data bits and 10 check bits, 8 binary columns out of 40 possible columns can be detected from the original parity check matrix.

Therefore, it should be understood that many modifications and changes can be made in the illustrated embodiment without departing from the spirit and scope of the invention as represented in the attached claims.

Having thus described my invention, what I claim as new, and desire to secure by Letters Patent is:

1. In an error correction system having a single bit error correction code and double error detection code for a memory in which bits of memory data words are divided into N packages of M bits per package, modularized error correction apparatus for correcting package errors including:

encoder means for encoding data words into code words in accordance with an N bit single error correction double error detection code that was expanded to cover N packages of M bits each so that the Exclusive-OR of all M single bit error syndromes in any given package N results in a composite syndrome which is unique for each package, decoder means including means comparing each single bit error syndrome with all possible single bit error syndromes and all possible composite syndromes to determine the location of any single bit error, any single package failure and to detect all double bit errors and all double package failures; and correction means for correcting errors located by said decoder means.

2. The error correction apparatus of claim 1 with MR correction bits protecting MK data bits where:

$N=K+R$ $K=R\cdot(R-1)\cdot(R-2)/3.$

3. The error correction apparatus of claim 2 where M=2.

4. The error correction apparatus of claim 3 where K=8.

* * * * *